J. C. FIELD.
Lawn Mower.
No. 100,742.
Patented March 15, 1870.
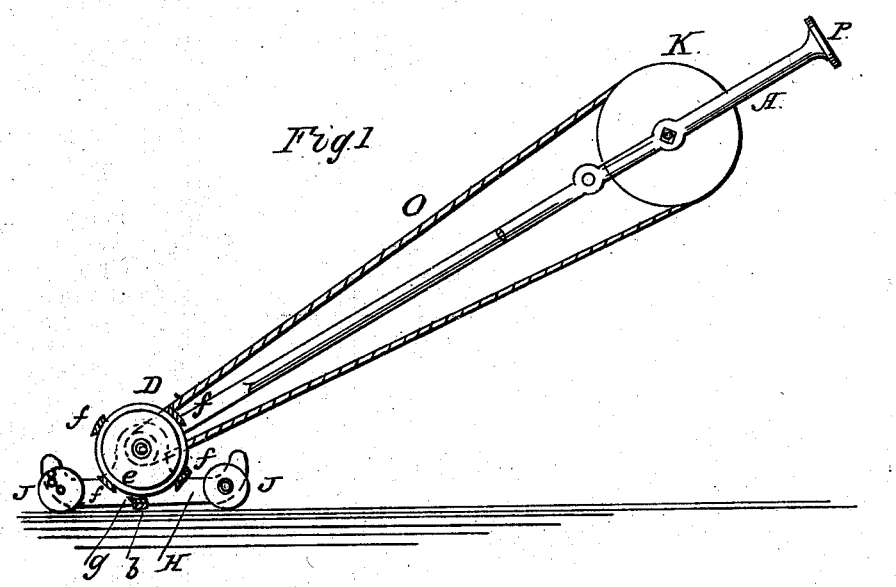
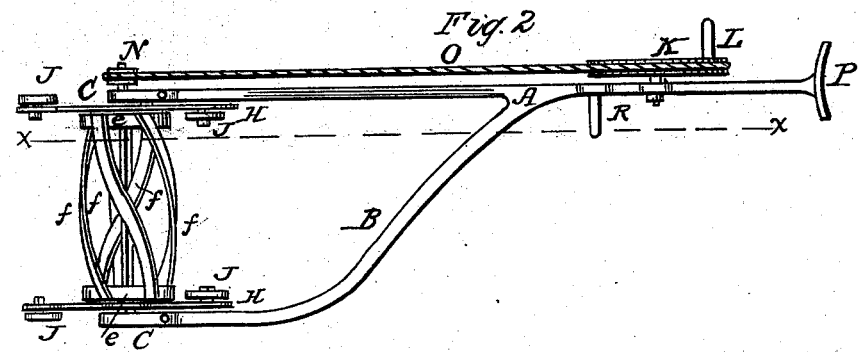

UNITED STATES PATENT OFFICE.

JOSEPH C. FIELD, OF CHICAGO, ILLINOIS.

IMPROVEMENT IN LAWN-MOWERS.

Specification forming part of Letters Patent No. 100,742, dated March 15, 1870.

*To all whom it may concern:*

Be it known that I, JOSEPH C. FIELD, of Chicago, in the county of Cook and State of Illinois, have invented a new and useful Improvement in Lawn - Mower; and I do hereby declare that the following is a full, clear, and exact description thereof, which will enable others skilled in the art to make and use the same, reference being had to the accompanying drawings, forming part of this specification.

This invention relates to lawn-mowers; and consists in a certain improvement thereon, which will be specified hereinafter.

In the accompanying drawing, Figure 1 represents a sectional side elevation of the mower as when in use, the section being through the line $x\ x$ of Fig. 2. Fig. 2 is a top or plan view.

Similar letters of reference indicate corresponding parts.

A is the propelling-bar, (with a branch, B,) so formed that it takes hold of hollow hubs on the sides of the carriage, as seen in the drawing at the points C C.

D represents the revolving cylinder, which consists of two heads, $e\ e$, on the shaft $f$, and a series of cutting-bars placed upon and fastened to the heads in a spiral position, as seen in Fig. 2. These cutters engage with a fixed bar or knife beneath the cylinder. (Seen in Fig. 1 at $g$.) This cutting-bar $g$, with which the cylinder engages, is attached at each end to the sides of the carriage H, which carriage is suspended from the cylinder-shaft. The cutting-bar or knife $g$ is placed upon and supported by a bed - piece, $i$, by which the two sides of the carriage are connected.

J represents wheels of the carriage on which the mower is supported. These wheels are connected with the sides of the carriage by pivots or axle - pins, which are adjustable in the sides by means of holes, as seen in the drawing. By this means the machine is made adjustable to the ground.

K is a band - wheel, which is revolved on a center-pin in the propelling - bar A, which is revolved by means of the handle L. N is a band-pulley on the end of the cylinder - shaft. O is the band. Instead of a band or cord, a belt may be employed, or a chain with links to take hold of lugs on the pulleys, or either of them.

P is the breast-piece. In operating with the mower the breast-piece (or end of the propelling-bar) is placed against the body. The left hand grasps the handle R, while with the right hand the wheel K is turned and the cylinder revolved.

By revolving the cutting - cylinder with an independent motion the work can be much more nicely executed than it can by the ordinary lawn-mower. This mower is made to be very light, weighing only about twenty pounds. As the speed of the cylinder is not dependent upon the forward motion of the mower, as in ordinary lawn - mowers, the work can be consequently better performed.

Having thus described my invention, I claim as new and desire to secure by Letters Patent—

The combination of the following elements in a lawn - mower, namely: the branched bar A B, driving band and pulleys operated by hand-crank, revolving and stationary cutters, and independent carriage, all co-operating in the manner specified.

JOSEPH C. FIELD.

Witnesses:
   A. J. BROWN,
   FRANK H. TOWER.